No Printed Specification Available
9588X
N. Adams,
Brick Machine.
Patented Apr. 13, 1836.
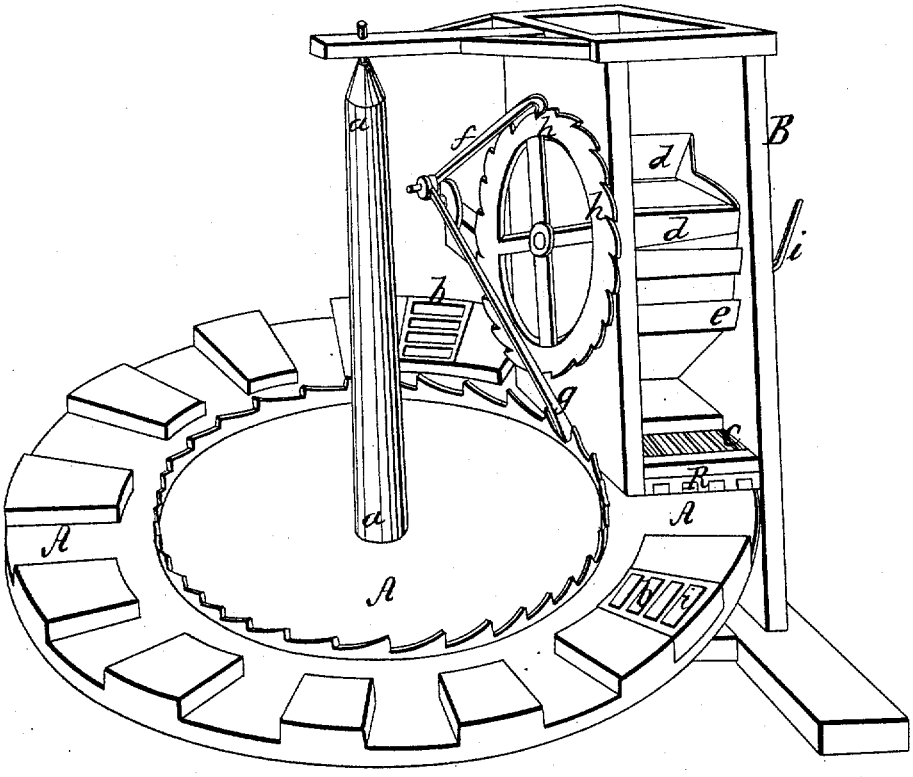
AM. PHOTO-LITHO. CO. N.Y. (OSBORNE'S PROCESS)

Nathaniel Adams. 9588X

The Schedule referred to in these Letters Patent and making part of the same, containing a description in the words of the said Nath l. Adams himself, of his "Improvement in making Bricks."

---

Specification of an improved mode of moulding bricks by a machine to be worked by steam or other power. The object had in view in this improvement is principally facility in the manufacture of brick. The moulds are to be placed on a horizontal wheel of Iron or other material 8 feet in diameter which turns upon an upright shaft inserted in a strong frame which moulds are to be sufficient in size to admit clay for four or more bricks. For depositing and pressing the clay in the moulds the following machinery is used 1st. a Box for the reception of the clay directly over the moulds the lower part of circular form in width corresponding with the length of the moulds at the bottom of which box apertures a little less than the size of the bricks to be made to admit the pa[illegible] of the clay into the moulds and over which apertures be used a screen of large wire to exclude coarse particles from the moulds. 2d. a horizontal shaft of iron through the centre of this Box with leaves of the same materials in length equal to the width of the box, jointed in such manner on the shaft that in the revolution upwards through the clay very little resistance to the shaft is opposed. The leaf being then suspended downwards. but in the revolution downwards the leaf being braced by an arm so as not to yield beyond a certain point the clay under it is pressed along until it reaches the apertures aforesaid. 3d. A vertical rag wheel on the end of this horizontal shaft outside of the Box into which a dog moved by a crank catches and thus causes the revolution of the shaft. The horizontal wheel is moved by another dog which pushes a rag wheel attached to the horizontal wheel and having a notch for each mould, which dog is also attached to the same crank just mentioned - which arrangement of the dogs and rag wheels operates to move the vertical and horizont[illegible] wheels alternately

9588X so that when by the movement of the horizontal wheel, the mould is
brought under the apertures of the clay box, that wheel then remains
stationary and the vertical wheel revolves and presses the clay into the
moulds - which being filled, the horizontal wheel is again put in
motion and removes the mould. The crank it is intended shall be
moved by steam power as the cheapest and most expeditious, but any
other power can of course be applied with equal convenience -
4th. A valve to permit the clay escaping upwards when too large a
quantity has been brought upon the mould, while at the same time
by attaching a weight, a sufficient quantity of the clay will be
always pressed into the mould; 5th. A valve under each aperture of
the clay box before mentioned to permit the passage of the mould
in case any hard substance should have been mixed with the
clay and protrude above the mould. In the annexed drawing
A.A. represents the large horizontal wheel a.a. the vertical shaft
in which it turns and bb are moulds, similar ones to which are to
be contained in all the other spaces represented in the wheel. B.B.
is the clay box which is represented open in order to shew the interior
dd are two wings in the horizontal revolving shaft intended to press
the clay down to the grated aperture C. f is a dog attached at or
to a crank, and which catching in the dogs or notches of the vertical
rag wheel - h - draws it round thus causing a revolution of the shaft
and leaves within the clay box, while by the small crank the dog g
is pressed against notches in the horizontal wheel thus causing an
alternate movement of the horizontal and vertical wheels by which
the moulds are successively brought under the aperture C, and the
clay then pressed into them. e is the valve or regulator of the
pressure on the clay in the mould, a weight being attached to the
crank i the valve is held down and thus the clay prevented from
escaping upwards until the pressure exceeds the weight. K is the
valve or set of valves which are intended to open when any large
hard substance mixed with the clay protrudes above the mould.
I claim as my invention the combination of the parts of said machine in the manner above described, or in any other manner substantially the same for the purposes aforesaid. But I do not claim any one of those parts separately or independently of the combination.

Witnesses
Edwd. Radcliff
Benjamin G. Hitchings

Nath. L. Adams

[884. wdo.] (Patented April 13. 1836.)

Drawing